United States Patent Office 3,574,633
Patented Apr. 13, 1971

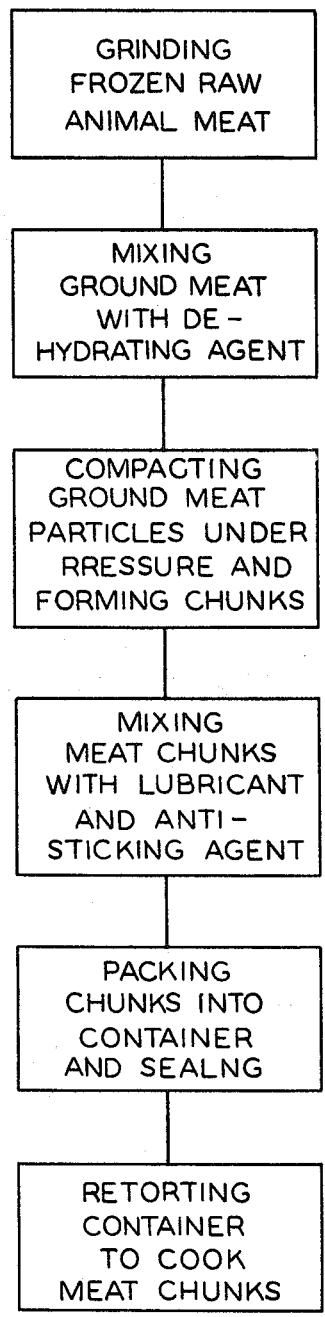

3,574,633
METHOD OF MAKING AND PACKAGING PET FOOD
Ronald J. Flier, Glendale, Mo., assignor to Ralston Purina Company, St. Louis, Mo.
Filed Jan. 26, 1967, Ser. No. 611,976
Int. Cl. A23k *1/00;* A23b *1/00*
U.S. Cl. 99—2                                                         7 Claims

ABSTRACT OF THE DISCLOSURE

The method of preparing and packaging an all-meat, so-called "chunk style" pet food involving the maintenance of the meat at low temperatures, below approximately 36° F., throughout forming of the meat into chunks and canning or packaging of the chunks, cooking of the meat being deferred until after packaging. The method includes the steps of grinding frozen raw animal meat to reduce the particle size of the meat, compacting the ground meat particles under a moderate pressure and forming the compacted particles into chunks while maintaining the temperature of the meat below 36° F., applying a lubricant to the chunks, packing the chunks into cans and heating the cans at a temperature of 245–250° F. to cook the chunks and coagulate the protein therein to produce a binding effect. The resulting product is in the form of distinct unitary chunks having a pleasing appearance and being of substantially uniform composition and quality the chunks retaining their integrity and shape at normal and heated temperatures.

BACKGROUND OF THE INVENTION

The present invention is in the field of methods or processes for preparing pet or animal foods and more particularly in the field of methods of preparing such foods in a so-called "chunk style" form.

Heretofore, various types of canned, so-called "chunk style" meat pet food products have been produced and marketed. These products have suffered from a number of shortcomings which detract from their commercial utility. Thus, in the past, such products have been prepared by selecting animal meats of unobjectionable appearance, cooking the meat, cutting it into the form of chunks consisting of small, irregular squares, mixing the chunks with a gravy substance and then canning and sealing the mixture. The resulting product is characterized by a nonuniform appearance and quality which is caused, to a large extent, by the fact that the appearance and quality of the raw materials employed dictates the appearance and quality of the final product. This being the case, it has generally been necessary in the past to use as raw materials more expensive animal meats having a satisfactory appearance since meats having an inferior appearance are readily detected in the final product. Accordingly, even though meats of inferior appearance may be equivalent and even nutritionally superior to meats having a good appearance, use of such meats has been restricted in connection with prior art processes. Further, because of unavoidable variations in the quality of raw materials supplied by different meat packers, for example, the products produced according to prior art processes have been of inconsistent and nonuniform quality and palatability. Also, such products have not displayed a desirably consistent or uniform shape similar to that of meat balls, for example. Additionally, because of the appreciable shrinkage of the meat which resulted upon cooking or retorting of the meat after canning, it has been the practice heretofore to cook the meat prior to canning thereof.

SUMMARY OF THE INVENTION

Therefore, among the several objects of the invention may be noted the provision of an improved method of preparing a pet food in the form of distinct chunks of substantially uniform quality, appearance, composition and palatability; the provision of such a method which permits the usage, as raw materials, of animal meats varying in appearance and type; the provision of a method of this character which substantially minimizes shrinkage of the final product in its cooked form; the provision of a method of the type indicated which produces a pet food having an improved appearance and palatability; and the provision of such a method which is economical and reliable to practice on a commercial scale. Other objects will be in part apparent and in part pointed out hereinafter.

The present invention is directed to the method of preparing and packaging a pet food in the form of distinct, unitary chunks comprising the steps of grinding frozen raw animal meat containing proteinaceous material to reduce the particle size thereof, compacting the ground meat particles under pressure to form distinct chunks of substantially uniform size while maintaining the meat at a temperature not greater than approximately 36° F., mixing the resultant chunks with a lubricant, packing the chunks into a container, sealing the container and heating the container to cook the chunks and produce a binding effect which enables the chunks to thereafter substantially retain their integrity and shape at normal and heated temperatures.

BRIEF DESCRIPTION OF THE DRAWING

The single figure of the drawing is a simplified flow chart illustrating one embodiment of the method of the invention.

DESCRIPTION OF THE PREFERRED EMBODIMENTS

In preparing pet foods in accordance with the method of the invention, animal meats having the requisite quality and palatability are first selected and formulated. The meats employed are selected so as to reduce the fat content and avoid an excess fat content in the final product while at the same time permitting the processor a wide range of flexibility in selecting the meat components making up the product. Based upon testing from the standpoint of palatability and processing, I have found that the following types of metal may be utilized within the range stated.

| Meat type: | Percentage by wt. |
|---|---|
| Beef gullets | 12–15 |
| Beef weasands | 10–25 |
| Carcass beef | 10–25 |
| Cheek trimmings | 1–12 |
| Heart caps | 0–5 |
| Lips | 10–21 |
| Lungs | 10–18 |
| Melts (spleen) | 0–5 |
| Scalded beef tripe | 7–15 |
| Slunks | 0–10 |
| Tonsils | 0–5 |

Preferably, the meat should be formulated so as to contain a total of at least 15% by weight of carcass beef, cheek trimmings and beef weasands since these three meat types contain appreciable amounts of water and salt soluble protein or striated protein which impart good binding properties to the final product as described more fully hereinafter.

In preparing a poultry pet food in accordance with the method of the invention, I have found that the following types of poultry meat may be advantageously employed in the ranges stated.

Meat type: Percentage by wt.
- Whole ground chicken parts _____ 50–100
- Ground chicken by-products _____ 0–25
- Turkey carcasses _____ 0–25

Since these poultry meat types contain relatively large amounts of muscle meat which are high in protein content, the final product prepared from such meat types exhibits good bonding properties as will appear hereinafter.

It will be understood that other animal meats containing proteinaceous material and suitable for pet animal consumption may be used in the practice of the invention.

The meat types from which the starting materials is formulated are maintaied in a frozen condition, preferably at a temperature of −20° F. to −5° F., in the form of 50 lb. blocks, for example. Conveniently, the required amounts of each meat type are employed in a given production run to produce the desired formulation in the final product. The frozen meat is first cut into squares or pieces, which may be 4″ x 4″ or larger in size, and these pieces are then fed to a grinder equipped with a ¼″ grinding plate to grind up the meat to reduce the particle size thereof. Preferably, in order to improve the bonding properties through coagulation of the water-soluble protein in the final product, the particle size of the meat is further reduced by grinding the resulting meat through a grinder equipped with a ⅛″ grinding plate. However, it will be understood that satisfactory results may be obtained by grinding the meat to a particle size of ¼″ or larger although less coarse products having improved bonding properties are secured by reducing the particle size further as by grinding through a plate having ⅛″ openings or smaller openings.

The grinding step or steps raises the temperature of the meat approximately 10° F. to 20° F. so that, depending upon the initial temperature of the meat fed to the grinders, the resulting ground meat is at a temperature of approximately 0° F. to 15° F. or 20° F. Desirably, the temperature of the meat is not permitted to rise above approximately 20° F. during the grinding operation.

The ground meat is next conveyed to a blender or mixer in which it is mixed with small amounts of sodium nitrite or other suitable coloring agent and wheat flour or other suitable dehydrating agent for a sufficient period of time, for example five minutes, to produce a uniform mixture of the various meat types and added components. The amount of sodium nitrite added in the mixing operation may be approximately 0.009–0.01% by weight based upon the weight of the meat and the amount of wheat flour or other dehydrating agent added may be approximately 3–5% by weight based upon the weight of the meat. The addition of a coloring agent and dehydrating agent may be dispensed with, if desired. However, I have found that the addition of a dehydrating agent is particularly advantageous since it absorbs moisture from the meat and facilitates forming of the meat into chunks in the next step of my process. Also, if a dehydrating agent is omitted from the mixture, it is necessary to exercise closer control over the temperature of the meat mixture and to maintain the mixture at a lower temperature than is otherwise the case since the moisture in the meat tends to thaw and render the meat slushy in consistency as the temperature approaches the freezing point of water. If a dehydrating agent is employed, the forming step may be carried out at higher temperatures inasmuch as the water or moisture in the meat is absorbed and is not available to adversely affect the consistency of the meat mixture.

The temperature of the meat mixture continues to rise during the mixing or blending operation and generally ranges between 22° F. and 31° F. upon completion of mixing. Since a further increase in temperature occurs during the subsequent forming step, it is highly desirable to hold the temperature of the meat mixture below about 30° F., preferably about 28° F., during the mixing operation and while the meat is being fed into the former.

Forming of the meat into chunk-like pieces is carried out in a grinder or extruder. For example, I have found that a grinder such as that shown in Pat. No. 2,796,901 when fitted with a specially designed head for subjecting the meat to a moderate amount of pressure, is satisfactory for purposes of the present invention. This grinder has a receiving hopper, a worm or screw type grinding member and a head with extrusion tubes. By lengthening the extrusion tubes to a length of approximately 4″, it was found that the extrudate is subjected to sufficient pressure, on the order of approximately 50–100 p.s.i., to compact the meat mixture and enable the chunks formed to retain their integrity during the remaining steps of the process. The compacted mass is extruded through outlet apertures which may measure, for example, from 0.5″ to 1.250″ in diameter. The head of the grinder is also fitted with a knife driven on the forming screw member and consisting of eight cutting blades adapted to cut the extrudate into chunk-like particles ranging in size from about 0.430 cu. in. to about 1.200 cu. in.

The grinder is equipped with a cooling jacket having a coolant, such as propylene glycol or ethylene glycol, circulating therethrough at a temperature of approximately 6–30° F., preferably 22–30° F. This effectively reduces the temperature of the grinder and maintains the temperature of the meat at the desired levels. The temperature of the formed meat is preferably about 30° F. for best results although satisfactory results may be obtained at temperatures up to about 36° F. If the temperature rises appreciably above 36° F., the chunks formed have a tendency to adhere or stick together. On the other hand, it is desirable to avoid having the temperature in the forming barrel of the grinder drop below about 22° F. inasmuch as the meat mixture tends to become too viscous for proper forming of the meat into unitary chunks.

The grinder may be operated at various speeds depending upon the production rate desired. Typically, for example, the grinder may be operated at speeds ranging from 40 r.p.m. to 160 r.p.m. with the lower speeds giving somewhat better forming results.

Following the forming operation, the discrete, unitary chunk-like pieces or particles are fed to a rotating coating drum in which a lubricant and, optionally, an antisticking or dehydrating agent are applied to the exterior surface of the particles. As an antisticking agent, any dehydrating agent capable of absorbing moisture from the surface of the chunks, my be utilized. Depending upon the temperature of the chunks being fed into the coating drum, moisture may form on the exterior surface of the chunks due to partial thawing of the meat. Since such moisture may cause sticking or adhering of the chunks together, it is desirable to apply an antisticking agent to the chunks although satisfactory results may be obtained without adding such as agent particularly when the chunks are at a temperature sufficiently below the freezing point of water, e.g., from about 28° F.–30° F. Preferably, about 2% by weight of wheat flour is added as the antisticking agent, but it will be understood that small amounts of similar agents such as ground cereal or milk whey may also be used. The antisticking material goes not solution when subjected to the retort conditions described hereinafter and becomes part of the thickening material for the gravy component. The antisticking agent also imparts a desirable surface sheen to the chunks coated therewith.

A lubricant is applied to the chunks in the coating drum in order to lubricate or slicken the exterior surface of the chunks and thereby enable them to be readily packed into cans or other containers. The preferred lubricant for use in the invention is sodium carboxymethyl cellulose (CMC) although other colloidal thickening agents, such as guar gum, for example, which when dissolved or suspended in water impart a lubricating effect, are also satisfactory for use. In the preferred embodiment of the invention, the lubricant is incorporated in a gravy component for application to the chunks, the lubricant functioning as a gravy thickening agent. Thus, I have found that a gravy composed of a mixture of water, sodium carboxymethyl cellulose and salt, is particularly useful and functions both as an effective lubricant and as a palatable and flavorful gravy when added to the chunks of meat and subsequently subjected to cooking as described hereinafter. Approximately 10% by weight of the gravy may be applied to the chunks for good results but smaller amounts such as 5% by weight may be satisfactorily used. In order to avoid premature thawing of the chunks prior to vacuum canning thereof, the gravy composition is continuously mixed and maintained at a temperature of approximately 28° F.–35° F. for application to the meat chunks.

Preferably, the antisticking agent is applied to the chunks in the first stage of a rotating drum while the gravy or lubricant is applied in the second stage of the drum. While the chunks being fed to the drum from the forming grinder are somewhat cylindrical in form, it has been found that the gentle tumbling action of the rotating coating drum with the attendant slight rise in the temperature of the chunks causes them to become more pliable and to assume a more pleasing and desirable chunk or ball shape somewhat similar to that of meat balls, for example.

The gravy coated chunks exiting from the coating drum are next fed onto a packing station for packing into cans or other containers. Although the cold state of the chunks would normally render canning or packing thereof somewhat difficult, the packing is facilitated by reason of the previously applied lubricant which slickens the exterior of the chunks. Preferably, an amount (e.g., 10% by weight) of a gravy composition such as that described above is precharged into the bottom of each can prior to packing the can with the chunks exiting from the coating drum in order to avoid entrapment of air in the bottom of the can. In the case of a beef type pet food made in accordance with the invention, I also prefer to meter an amount (e.g., 10% by weight) of a similar gravy composition into the top of each can after the can has been packed with the proper amount of meat chunks. After packing, the cans are vacuum sealed employing conventional sealing procedures and the cans are then rinsed to free them of spilled gravy or meat on the exterior surface thereof.

Within a short period, preferably not more than 30 minutes, after completion of the canning step, the cans are then subjected to heating or retorting in order to cook the raw meat chunks to effect commercial sterilization thereof and to effect coagulation of the protein therein to bind the particles of each chunk together. The binding effect produced by heating the chunks enables the chunks to thereafter substantially retain their integrity and ball-like shape at normal and heated temperatures. Conventional retorting procedures may be employed for heating the cans which may be effected by heating to a predetermined temperature for a sufficient length of time to obtain the binding effect. Typically, a retorting temperature of approximately 245° F.–250° F. for approximately 90 minutes is used for good results. Although it will be understood that higher or lower temperatures may be used to achieve retorting in shorter or longer periods of time. Upon completion of the proper heating cycle, the cans are cooled, rinsed and allowed to dry. In general, it is preferred that the heated cans be cooled as rapidly as is practicable in order to minimize fatting out of the fat content of the meat chunks.

The finished product consists of distinct unitary meat chunks having a pleasing appearance, a palatable odor, a slick surface sheen, and a minimum of thick transparent gravy, the chunks ranging in size from 0.430 cu. in. to 1.200 cu. in. In the case of a beef product made in accordance with the invention, the chunks have a rich red color while in the case of a chicken product, the chunks have rich light yellow coloration and a distinct clean chicken odor. Not only are such chunks of substantially uniform quality and composition, but they display a decidedly improved palatability and appearance somewhat resembling meat balls.

If desired, a less expensive pet food product may be made according to the invention by adding scrambled eggs or other food substances to a beef product prepared as described above. Such a product may comprise, for example, 50% by weight beef, 30% by weight cooked eggs and 20% by weight of a gravy composition.

The following example illustrates the invention.

Frozen meat (—5° F.) in the form of 50 lb. blocks was first cut into squares approximately 4″ x 4″ in size and the squares were conveyed to a meat grinder equipped with a ¼″ grinding plate. The proportions of meat types were as follows:

| Meat type | Parts by wt. |
| --- | --- |
| Beef gullets | 14.4 |
| Carcass beef | 24.4 |
| Cheek trimmings | 2.0 |
| Lips | 16.4 |
| Lungs | 18.391 |
| Melts (spleen) | 5.0 |
| Tripe | 14.4 |

The ground meat is then reground in a meat grinder equipped with a ⅛″ grinding plate to further reduce the particle size of the meat. The temperature of the meat upon completion of grinding was approximately 15° F.

The ground meat is next fed to a blender or mixer in which the meat is thoroughly admixed with sodium nitrite (0.009 part by weight) in water (10 parts of water to 1 part of sodium nitrite) and wheat flour (3 parts by weight). After mixing for approximately five minutes during which the temperature of the meat rose to approximately 28° F. the mix was fed into the receiving hopper of a meat former or extruder ("Autio 801" grinder) fitted with a head which subjected the meat to a moderate amount of pressure on the order of 50–100 p.s.i. The former was equipped with a cooling jacket having propylene glycol circulating therethrough at a temperature of approximately 22° F. The compacted mass of meat was extruded through the outlet apertures of the former and the extrudate was cut by a knife into chunk-like pieces, somewhat cylindrical in appearance, ranging in size from about 0.430 cu. in. to about 1.200 cu. in. The temperature of the formed chunk-like pieces was approximately 30° F.

The chunk-like pieces were next fed to an inclined rotating coating drum in the first stage of which wheat flour (2 parts by weight) was applied to the exterior surface of the chunks to prevent adhering together or sticking of the chunks. In the second stage of the drum, a mixture (10 parts by weight) of water, salt and sodium carboxymethyl cellulose (96 parts water, 3 parts salt and 1 part sodium carboxymethyl-cellulose) was applied to the chunks as a gravy component or lubricant. The gravy component was fed into the drum from a mixing tank in which the gravy component was maintained at a temperature of 28° F. In traveling through the drum and being coated with the wheat flour and gravy component, the chunks assumed a ball-like shape due to the gentle tumbling action of the drum.

The chunks exited from the drum onto a horizontal, rotating packing station and were packed into cans prefilled with 10 parts by weight of the above-described gravy component. The cans were topped off with an additional 10 parts by weight of the gravy component, sealed under a vacuum and rinsed to remove spilled gravy and meat from the outside thereof.

The cans were placed in bins or baskets which were lowered into vertical retorts operating at a temperature of approximately 245° F.–250° F. The cans were heated at this temperature for approximately 90 minutes to cook the meat and coagulate the protein to produce a binding effect within each chunk. The cans were then cooled, rinsed and allowed to dry.

Upon inspection, the finished product consisted of distinct chunks having a rich red color and slick surface sheen and having a substantially uniform appearance and an agreeable odor. The chunks were of substantially the same size before and after the cooking step, no appreciable shrinkage having occurred. Further, the chunks were found to retain their shape and integral form at normal and heated temperatures. In feeding the finished product to dogs, it was found to be highly palatable.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

What is claimed is:

1. The method of preparing and packing a pet food in the form of distinct unitary chunks of substantially uniform appearance and composition comprising the steps of grinding frozen raw animal meat to reduce the particle size thereof, compacting the ground meat particles under pressure to form distinct chunks of substantially uniform size while maintaining the meat at a temperature not greater than approximately 36° F., mixing the resultant chunks with a gravy type lubricant, packing the chunks into a container, sealing the container and heating the container to cook the meat chunks while effecting coagulation of the protein therein and produce a binding effect which enables the chunks to thereafter substantially retain their integrity and shape at normal and heated temperatures.

2. The method of preparing and packaging a pet food as set forth in claim 1 wherein the container is heated at a temperature of approximately 245–250° F. for a period of about ninety minutes.

3. The method of preparing and packaging a pet food in the form of distinct unitary chunks of substantially uniform appearance and composition comprising the steps of grinding frozen raw animal meat to reduce the particle size thereof, said meat being selected from meat types of the group consisting of beef gullets, beef weasands, carcass beef, cheek trimmings, heart caps, lips, lungs, melts, scalded beef tripe, slunks and tonsils, with at least 15% by weight of said meat consisting of carcass beef, cheek trimmings and beef weasands, compacting the ground meat particles under pressure to form distinct chunks of substantially uniform size while maintaining the meat at a temperature not greater than approximately 36° F., mixing the resultant chunks with a gravy type lubricant, packing the chunks into a container, sealing the container and heating the container to cook the meat chunks while effecting coagulation of the protein therein and produce a binding effect which enables the chunks to thereafter substantially retain their integrity and shape at normal and heated temperatures.

4. The method of preparing and packaging a pet food in the form of distinct unitary chunks of substantially uniform appearance and composition comprising the steps of grinding frozen raw animal meat to reduce the particle size thereof, mixing the ground meat particles together with a dehydrating agent to produce a substantially uniform mixture, compacting the mixture under sufficient pressure to form distinct chunks of substantially uniform size while maintaining the meat at a temperature not greater than approximately 36° F., mixing the resultant chunks with a gravy type lubricant while subjecting the chunks to a gentle tumbling action, packing the chunks into a container, sealing the container under a vacuum and heating the container to cook the meat chunks while effecting coagulation of the protein therein and produce a binding effect which enables the chunks to thereafter substantially retain their integrity and shape at normal and heated temperatures.

5. The method of preparing and packaging a pet food as set forth in claim 4 wherein the dehydrating agent is wheat flour.

6. The method of preparing and packaging a pet food in the form of distinct unitary chunks of substantially uniform appearance and composition comprising the steps of grinding frozen raw animal meat to reduce the particle size thereof, mixing the ground meat particles together with a dehydrating agent to produce a substantially uniform mixture while maintaining the temperature of the mixture below approximately 31° F., compacting the mixture under pressure and forming the compacted mixture into distinct chunks of substantially uniform size while maintaining the meat at a temperature not greater than approximately 36° F., mixing the resultant chunks with a gravy type lubricant and an antisticking agent while subjecting the chunks to a gentle tumbling action, packing the chunks into a container, sealing the container under a vacuum and heating the container to cook the meat chunks while effecting coagulation of the protein therein and produce a binding effect which enables the chunks to thereafter substantially retain their integrity and shape at normal and heated temperatures.

7. The method of preparing and packaging a pet food as set forth in claim 6 wherein the lubricant is sodium carboxymethyl cellulose and the antisticking agent is wheat flour and imparts a surface sheen to said chunks.

References Cited
UNITED STATES PATENTS

| | | | |
|---|---|---|---|
| 2,874,060 | 2/1959 | Turner et al. | 99—109X |
| 2,927,029 | 3/1960 | Long | 99—187X |
| 2,938,796 | 5/1960 | Zick | 99—187X |

FOREIGN PATENTS

| | | | |
|---|---|---|---|
| 568,250 | 3/1945 | Great Britain | 99—187 |
| 688,869 | 6/1964 | Canada | 99—108 |

HYMAN LORD, Primary Examiner

U.S. Cl. X.R.

99—187